United States Patent [19]

Kuklo

[11] Patent Number: 5,400,184
[45] Date of Patent: Mar. 21, 1995

[54] KINEMATIC HIGH BANDWIDTH MIRROR MOUNT

[75] Inventor: Thomas C. Kuklo, Oakdale, Calif.

[73] Assignee: The United States of America as represented by the United States Department of Energy, Washington, D.C.

[21] Appl. No.: 968,114

[22] Filed: Oct. 29, 1992

[51] Int. Cl.⁶ .................... G02B 7/182; B61L 5/12
[52] U.S. Cl. .................... 359/873; 359/871; 359/877; 248/476
[58] Field of Search ............ 359/871, 872, 873, 877, 359/881, 874, 876; 372/107; 248/469, 475.1, 476, 477, 478, 479, 483, 484, 485, 486, 487; 356/345, 346

[56] References Cited

U.S. PATENT DOCUMENTS

| | | | |
|---|---|---|---|
| 3,565,515 | 2/1971 | de Mey | 359/874 |
| 3,897,139 | 7/1975 | Caruolo et al. | 359/873 |
| 3,953,113 | 4/1976 | Shull | 350/288 |
| 4,060,314 | 11/1977 | Heinz | 248/487 |
| 4,293,112 | 10/1981 | Horton | 248/487 |
| 4,401,288 | 8/1983 | Thompson | 248/476 |
| 4,442,524 | 4/1984 | Reeder et al. | 372/107 |
| 4,638,486 | 1/1987 | Dost et al. | 372/107 |
| 4,672,626 | 6/1987 | Koseki | 372/107 |
| 4,796,275 | 1/1989 | Koop | 372/107 |
| 4,925,288 | 5/1990 | Harris | 359/876 |
| 5,239,361 | 8/1993 | Burch | 356/345 |

FOREIGN PATENT DOCUMENTS 2059143 9/1980 United Kingdom ......... H01S 3/086
901968 2/1980 U.S.S.R. .................. G02B 7/18

OTHER PUBLICATIONS

Tarabocchia, Martin, et al., "Intracavity Tip and Tilt Adaptive Control Experiments", *Proceedings of the Society of Photo-Optical Instrumentation Engineers*, Washington, D.C., vol. 141, 1978, pp. 20–25.

Primary Examiner—Loha Ben
Assistant Examiner—Darryl J. Collins
Attorney, Agent, or Firm—Isabelle R. McAndrews; Miguel A. Valdes; William R. Moser

[57] ABSTRACT

An adjustable mirror mount system for a mirror is disclosed comprising a mirror support having a planar surface thereon, a mirror frame containing a mirror and having a planar surface behind the mirror facing the planar surface of the mirror support and parallel to the reflecting surface of the mirror and mounted pivotally to the mirror support at a point central to the frame, a first adjustment means between the mirror support and the mirror frame spaced from the central pivot mount for adjusting the movement of the mirror along one axis lying in the plane of the planar surface of the mirror frame; and a second adjustment means between the mirror support and the mirror frame spaced from the central pivot mount for adjusting the movement of the mirror along a second axis lying in the plane of the planar surface of the mirror frame and perpendicular to the first axis.

18 Claims, 3 Drawing Sheets

KINEMATIC HIGH BANDWIDTH MIRROR MOUNT

The invention described herein arose in the course of, or under, Contract No. W-7405-ENG-48 between the United States Department of Energy and the University of California.

BACKGROUND OF THE INVENTION

In the construction and operation of certain optical systems such as, for example, laser beam optical transport systems, it is often required that the mirror systems employed in such systems be rapidly adjustable to permit active compensation for beam position jitter due to mechanical system vibration, ground motion, or laser system jitter.

Various provisions have been previously made for the adjustment of mirrors used in optical systems. Shull U.S. Pat. No. 3,953,113 teaches a laser mirror mounting device which provides for the exchangeability of sets of mirrors associated with various wavelengths of operation. The mirror mounting device is positioned within a housing which includes an adjustable internal reference surface for adjustment relative to an external reference surface included with the mirror mounting device. The device also includes support means for supporting a mirror relative to a laser and an adjustment means for adjusting the angular relationship of the mirror relative to the external reference surface.

Thompson U.S. Pat. No. 4,401,288 discloses an optical mirror mount in an upright position on a horizontal surface and which is adjustable in pitch and yaw. The mount includes a bracket having a horizontal leg and a vertical leg. Yaw adjustments are made by loosening mounting screws holding the bracket on a supporting surface and rotating the bracket about the mounting screw extending into the circular mounting hole in the horizontal leg. Pitch adjustments are made by turning an adjusting screw in a flexure spring until the vertical leg of the bracket is at the desired position in pitch.

Horton U.S. Pat. No. 4,293,112 describes apparatus for mounting and aligning an optical element on a support structure which comprises pivot means for mounting the element so that it can rotate about axes in two orthogonal directions and a pair of alignment means, each comprising a plunger and inclined guide groove. Adjustment means such as threaded screws, are provided for urging the plunger along the inclined grooves.

Reeder et al. U.S. Pat. No. 4,442,524 discloses a four-bar alignment adjustment mechanism with elastic hinges to enable the mirrors of a gas laser to be very finely tuned.

Koseki U.S. Pat. No. 4,672,626 describes the adjustment of the rear or output mirror of a laser oscillator by pivoting a laser mirror holder about three pivot points connecting the laser mirror holder and a support bracket. The first and third pivot points form an X-axis about which the holder may be rotated and the second and third pivot points form a Y-axis about which the holder may be rotated. The first and second pivot points are mounted so as to displace the holder in a direction parallel to the central longitudinal axis of the holder. Two control motors are disposed with their actuating shafts transverse to the central longitudinal axis of the laser mirror holder, at opposite sides of the holder and act against the first and second pivot points to adjust the angular alignment of the laser mirrors.

Koop U.S. Pat. No. 4,796,275 discloses a floating mirror mount in which a resiliently biased spring plate biases the mirror against a peripheral flange of a keeper while permitting the mirror to be lifted off the flange of the keeper when the front surface of the mirror is engaged by mirror positioning structure of a laser in the course of installing the mirror mount in a laser.

Great Britain Patent 2,059,143 describes a deformable support structure for supporting a controllable mirror for a laser. The support structure comprises a rim and a center post joined together by two spaced apart flexible membranes. Piezo-electric ceramic wafers are coupled to the support to provide adjustment of the mirror.

Russian Patent Abstract SU-901-968 describes the use of moving and stationary radially displaced discs interconnected by a screw thread in a gas laser optical system adjustment mechanism.

Tarabocchia et al., in an article entitled "Intracavity Tip and Tilt Adaptive Control Experiments" published in the Proceedings of the Society of Photo-Optical Instrumentation Engineers, Vol. 141 (1978), pp. 20–25, describe the use of a 2-axis tip and tilt dynamic mirror mount developed at Stanford Research Institute.

However, there remains a need for an adjustable mirror system capable of rapid adjustment with very little force so that an increased frequency of mirror compensation can be applied for beam jitter. There also remains a need for an adjustable mirror system wherein adjustment in either the X or Y axes may be made with a minimum of crosstalk between the axes.

SUMMARY OF THE INVENTION

It is an object of the invention to provide an adjustable mirror mount system for a mirror comprising a mirror support having a planar surface thereon, a mirror frame containing a mirror and having a planar surface behind the mirror facing the planar surface of the mirror support and parallel to the reflecting surface of the mirror and mounted pivotally to the mirror support at a point central to the frame, a first adjustment means between the mirror support and the mirror frame spaced from the central pivot mount for adjusting the movement of the mirror along one axis lying in the plane of the planar surface of the mirror frame; and a second adjustment means between the mirror support and the mirror frame spaced from the central pivot mount for adjusting the movement of the mirror along a second axis lying in the plane of the planar surface of the mirror frame and perpendicular to the first axis.

It is another object of the invention to provide an adjustable mirror mount apparatus similar to that described, but wherein the central pivot mount comprises a sphere partially received in a central conical opening in the planar surface of the end wall of the mirror frame, the conical opening having a smaller diameter than the sphere and having its center axis coaxial to the center axis of the mirror frame; and the mirror support also has a conical opening therein of smaller diameter than the sphere and which also partially receives the sphere.

It is still another object of the invention to provide an adjustable mirror mount apparatus similar to that described, but wherein the first adjustment means comprise first yieldable means coupled between the mirror frame and the mirror support for biasing the mirror frame toward the mirror support, and first adjustable driver means mounted to the mirror support and in contact with the mirror frame to resist the bias of the first yieldable bias means; and the second adjustment means comprise second yieldable means coupled between the mirror frame and the mirror support for biasing the mirror frame toward the mirror support and second adjustable driver means mounted to the mirror support and in contact with the mirror frame to resist the bias of the second yieldable bias means; to thereby provide adjustment of the mirror in both the X and Y axes of the plane of the reflective surface.

It is still a further object of the invention to provide an adjustable mirror mount apparatus similar to that described, but wherein the center of the sphere comprising the central pivot mount, and the contact point between the first adjustable driver means and the mirror frame lie in a first plane perpendicular to the plane of the reflecting surface of the mirror; and the center of the sphere comprising the central pivot mount, and the contact point between the second adjustable driver means and the mirror frame lie in a second plane also perpendicular to the plane of the reflecting surface of the mirror and perpendicular to the first plane.

It is another object of the invention to provide an adjustable mirror mount apparatus similar to that described, but wherein the attachment point of the first yieldable means to the mirror frame, the contact point between the first adjustable driver means and the mirror frame, and the center of the sphere comprising the central pivot mount all lie in a first plane perpendicular to the plane of the reflecting surface of the mirror; and the attachment point of the second yieldable means to the mirror frame, the contact point between the second adjustable driver means and the mirror frame, and the center of the sphere lie in a second plane also perpendicular to the plane of the reflecting surface of the mirror and perpendicular to the first plane.

It is yet a further object of the invention to provide an adjustable mirror mount apparatus similar to that described, but wherein the first adjustable driver means is provided with a hemispherical end portion in contact with the planar surface of the mirror frame; and the radius of the hemispherical end portion is equal to the radius of the sphere comprising the central pivot mount less the distance which the sphere extends into the conical bore, whereby the center of the hemispherical end portion of said first adjustable driver means and the center of the sphere will lie in a plane parallel to the plane of the reflective surface of the mirror.

It is another object of the invention to provide an adjustable mirror mount apparatus similar to that described, but wherein the second adjustable driver means is also provided with a hemispherical end portion and the second hemispherical end portion is received in a groove formed in the planar surface of the mirror frame, whereby rotation of the mirror frame in the plane of the reflective surface of the mirror is inhibited.

It is still another object of the invention to provide an adjustable mirror mount apparatus similar to that described, but wherein the radius of the second hemispherical end portion less the distance which the hemispherical end portion extends into the groove is equal to the radius of the sphere comprising the central pivot mount less the distance which the sphere extends into the conical bore in the planar surface of the mirror frame; whereby the center of the hemispherical end portion of the second adjustable driver means and the center of the sphere will also lie in a plane parallel to the plane of the reflective surface of the mirror.

It is yet another object of the invention to provide an adjustable mirror mount apparatus similar to that described, but wherein first transducer means are operationally connected to the first adjustable driver means to adjust the mirror in one axis of the plane of the reflective surface of the mirror; and second transducer means are operationally connected to the second adjustable driver means to adjust the mirror in the other axis of the plane of the reflective surface of the mirror.

These and other objects of the invention will be apparent from the following description and accompanying drawings.

DETAILED DESCRIPTION OF THE INVENTION

Figure 1:
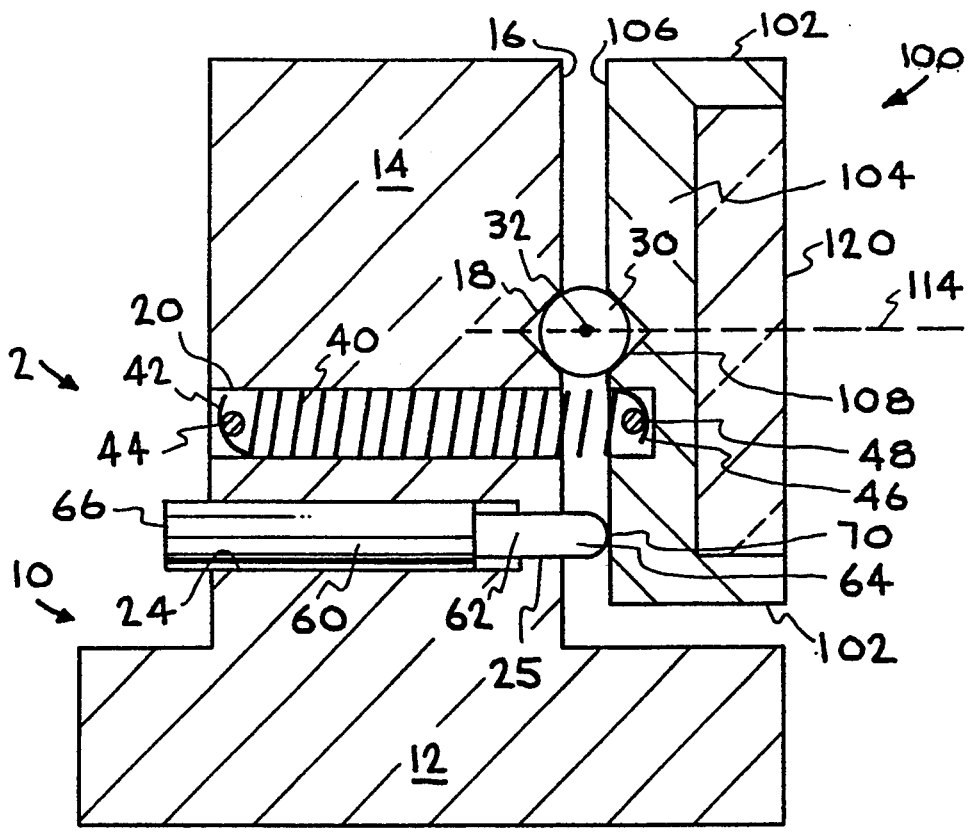
FIG. 1 is vertical cross-sectional view of the adjustable mirror mounting apparatus showing the vertical mirror adjusting means.
Figure 2:
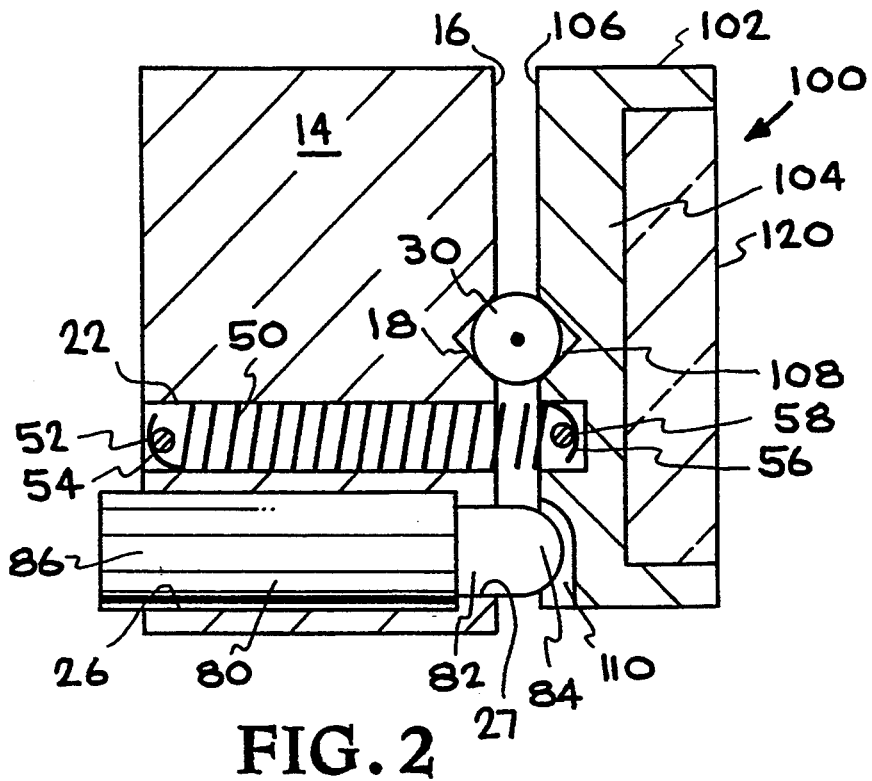
FIG. 2 is a sectioned view looking down from the top of the apparatus showing the horizontal mirror adjusting means.

Referring now to FIGS. 1 and 2, the adjustable mirror mounting apparatus of the invention is generally indicated at 2 comprising a mirror mounting base 10 on which is pivotally mounted, via a pivot ball 30, a cylindrical mirror frame 100 containing a mirror 120. Mirror frame 100 and mirror 120 are pivotally secured to base 10 via biasing means 40 and 50, vertical adjustable driver means 60, and horizontal adjustable driver means 80.

Base 10 of adjustable mirror mounting apparatus 2 comprises a horizontal portion 12 and an upright portion 14. Mounted to one face or surface 16 on upright portion 14 is a mirror frame 100 containing a mirror 120. Mirror frame 100 comprises a side wall 102, which surrounds the sides of mirror 120, and a rear wall 104 having a planar surface 106 thereon which is parallel to the reflective surface of mirror 120 and which faces surface 16 of base 10.

Mirror 120, mirror frame 100, and sidewall 102 may comprise any geometrical shape, provided there is a central point therein which can be used as a central pivot point as will be described below. However, by way of illustration, and not of limitation, mirror 120 and mirror frame 100 will hereinafter be described as circular or cylindrical in shape.

Centrally positioned in planar surface 106 is a conically shaped bore 108. By "centrally positioned" is meant that the axis of the cone of conically shaped bore 108 is coincident with the center axis of cylindrical mirror frame 100, as shown by dotted line 114 in FIG. 1. Preferably, the sides of conically shaped bore 108 are 45° with respect to planar surface 106, so that viewed in cross-section, bore 108 appears to be a 90° v-shaped groove.

Received in conical bore 108 is spherical pivot ball 30 having a diameter larger than the diameter of conical bore 108, i.e., larger than the base defined by conical bore 108 at planar surface 106.

Surface 16 of upright portion 14 of base 10 is similarly provided with a conical bore 18 which may have identical dimensions to conical bore 108 whereby, as shown in FIGS. 1 and 2, surface 16 of base 10 will be spaced from planar surface 106 of mirror frame 100 by spherical ball 30 to thereby permit mirror frame 100 to pivot in either the X or Y axis with respect to base 10.

As previously mentioned, mirror frame 100 and mirror 120 are pivotally secured to base 10 via biasing means 40 and 50, vertical adjustable driver means 60, and horizontal adjustable driver means 80. As shown in FIG. 1, biasing means 40 is illustrated as comprising a metal spring which is received in a horizontal bore 20 in upright portion 14 of base 10, as shown in FIG. 1. Biasing means 40 is secured, at one end 42, to upright portion 14 of base 10 by any convenient securement means such as, for example, pin 44, which is longer than the diameter of bore 20, and therefore may be passed through the looped end 42 of biasing means 40 to facilitate easy disassembly and removal of mirror frame 100 from base 10. Biasing means 40 is secured to planar surface 106 of mirror frame 100 at its opposite end 46 by any convenient securement means such as a screw 48 received in rear wall 104 of mirror frame 100.

Referring to FIG. 2, biasing means 50 is also illustrated as a metal spring which is similarly received in a horizontal bore 22 in upright portion 16 of base 10 and may be secured therein at one end 52 by a pin 54, in similar fashion to the securement of biasing means 40 by pin 44. Biasing means 50 may be secured at its opposite end 56 to planar surface 106 of mirror frame 100 by a screw 58 received in rear wall 104 of mirror frame 100.

It should be noted that while biasing means 40 (and 50) are herein illustrated as comprising metal springs, they may comprise any convenient biasing means such as elastomeric members, e.g., rubber grommets, or dashpots. When a metal spring is used as either biasing means 40 or 50, the stiffness of the spring must be selected, or otherwise adjusted, so that the spring is not too loose, since this may cause the mirror frame to bounce on the adjustment means or adjustable driver means 60 and/or 80. Similar precautions will need to be taken with any other type of biasing means as well.

It is also important that the biasing means (40 or 50) be carefully selected with respect to the resonant frequency of the biasing means (40 or 50) relative to the frequency of operation of the mirror adjustment means. It is preferable to select components such as the biasing means (40 or 50) with a resonant frequency of about 10 times the desired operating frequency. Thus, when the mirror adjustment means will be operated in a moderate band frequency of about 100–500 Hz, the resonant frequency of the biasing means (40 or 50), e.g., the springs should be about 10 times this, or from about 1000–5000 Hz.

A vertical adjustable driver means 60, as shown in FIG. 1, is received in a horizontal bore 24 and reduced diameter counterbore 25 in upright portion 16 of base 10. Vertical adjustment means 60 comprises a rod or piston 62 which is received in counter bore 25 and which is provided with a hemispherical head 64 thereon which makes point contact, at 70, with planar surface 106 of end wall 104 of mirror frame 100. Vertical adjustable driver means 60 operates in cooperation with spring 40 which acts to urge or bias planar surface 106 against hemispherical head 64.

Piston 62 of vertical adjustable driver means 60 is operationally coupled to means for horizontally moving piston toward and away from planar surface 106 such as, for example, a transducer or driver 66 received in bore 24, and which may be connected to a tunable power supply (not shown) which can be operated at a frequency selected to move mirror 120 in its Y axis an exact amount to counter the Y axis jitter in the optical signal being reflected by mirror 120. Transducer 66 may comprise any means capable of imparting physical motion to piston 62 in response to a signal, such as, for example, a voice coil, a piezoelectric device, or a magnetostrictive device.

Piston 62 may be threadedly received in transducer 66 to thereby provide initial gross adjustment of piston 62 against planar surface 106 relative to the spring bias of biasing means 40 so that planar surface 106 is initially aligned, along the Y axis with surface 16 of base 10. Such an initial alignment function could, of course, be automated, for example by motorizing the rotation of threaded piston 62 to initialize the alignment.

Figure 3:
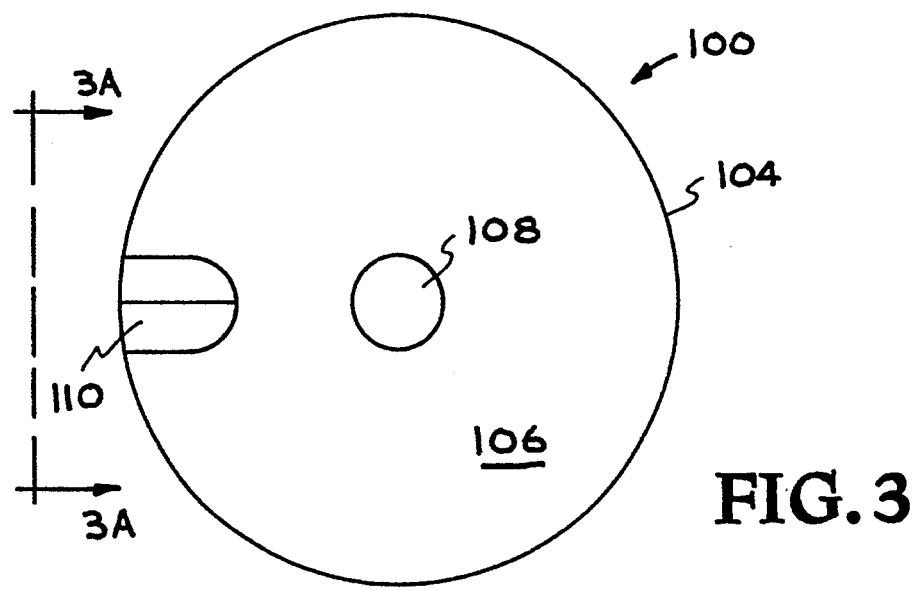
FIG. 3 is a vertical view of the rear of the mirror frame, showing a groove formed to receive a portion of the horizontal mirror adjusting means to inhibit rotation of the mirror and mirror frame.
Figure 3A:
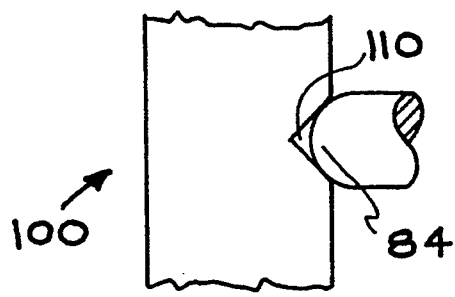
FIG. 3A is a fragmentary side section view of a portion of FIG. 3 taken at lines 3A—3A to show the fit of the hemispherical head in the v-shaped groove.

Referring now again to FIG. 2, a horizontal adjustable driver means 80, generally similar to vertical adjustable driver means 60, may be mounted in horizontal bore 26 and counterbore 27 in upright portion 14 of base 10. Horizontal adjustment means 80 comprises a piston 82 which fits into counterbore 27 and is provided with a hemispherical head 84 thereon. However, in this instance, hemispherical head 84 does not make point contact with the planar surface 106, but is rather received in a horizontal 90° v-shaped groove 110 formed in rear wall 104 of mirror frame 100 adjacent the edge thereof, as seen in FIGS. 2, 3, and 3A.

The purpose of horizontal groove 110 is to inhibit the rotation of mirror frame 100 and mirror 120 in the Z axis as adjustments are made in the X and Y axes. Since hemispherical head 84 is partially received in horizontal v-shaped groove 110, head 84 is preferably formed having a larger radius than hemispherical head 64, as will be explained below.

As in the case of vertical adjustable driver means 60, horizontal adjustable driver means 80 further comprise means, such as transducer 86, received in bore 26 for moving piston 82 toward and away from planar surface 106 in cooperation with the spring bias of biasing means 50.

Similarly, as previously described with respect to transducer 66, transducer 86 may be connected to a tunable power supply (not shown) which can be operated at a frequency selected to move mirror 120 in its X axis an exact amount to counter the X axis jitter in the optical signal being reflected by mirror 120. As previously described with respect to transducer 66, transducer 86 may comprise any means capable of imparting physical motion to piston 82 in response to a signal.

Piston 82 may be threadedly received in transducer 86 to thereby provide initial gross adjustment of piston 82 against planar surface 106, relative to the spring bias of biasing means 50, so that planar surface 106 is initially aligned along the X axis with surface 16 of base 10. As previously mentioned, such an initial alignment function may be automated, for example, by motorizing the rotation of threaded piston 82.

Figure 4:
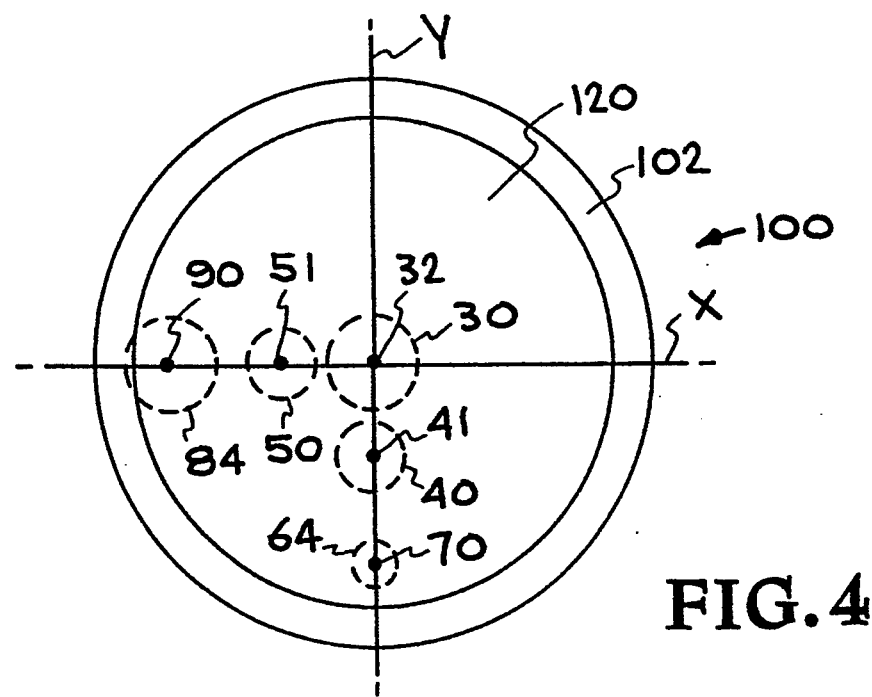
FIG. 4 is a front view of the mirror illustrating the respective alignment, along the vertical and horizontal axes of the mirror, of the vertical and horizontal adjustment means with the center of the mirror.

Turning now to FIG. 4, it is necessary for proper alignment that the center 32 of spherical pivot ball 30 and the contact point 70 of hemispherical head 64 lie in a plane which is perpendicular to the X axis of mirror 120, and similarly that the center 32 of spherical pivot ball 30 and the contact point 90 of hemispherical head 84 lie in a plane perpendicular to the Y axis of mirror 120. Preferably, however, as shown in FIG. 4, it is desirable if the respective contact points of biasing means 40 and 50 also lie in the respective planes just described.

Therefore, as shown in FIG. 4, in a preferred embodiment, contact point 70 of hemispherical head 64, contact point 41 of biasing means 40, and center 32 of spherical ball 30 all lie in a plane which is perpendicular to the plane of planar surface 106, and therefore, perpendicular to the reflective surface of mirror 120, i.e., in the Y-Z plane.

Similarly, in a preferred embodiment the equivalent contact point 90 (equivalent because hemispherical head 84 is received in v-shaped groove 110 and does not, therefore, make a single point contact with end wall 106), contact point 51 of biasing means 50, and center 32 of spherical pivot ball 30 all lie in a second plane (the X-Z plane) which is also perpendicular to the X-Y plane of planar surface 106, as well as perpendicular to the first plane (the Y-Z plane).

Such alignment of the respective contact points of hemispherical heads 64 and 84 of pistons 62 and 82 with the center point 32 of spherical pivot ball 30 and the respective attachment point 41 and 51 of biasing means 40 and 50 reduce the cross-talk between the X and Y axes as respective adjustments are made to each to compensate for the movement of the optical signal being reflected.

Figure 6:
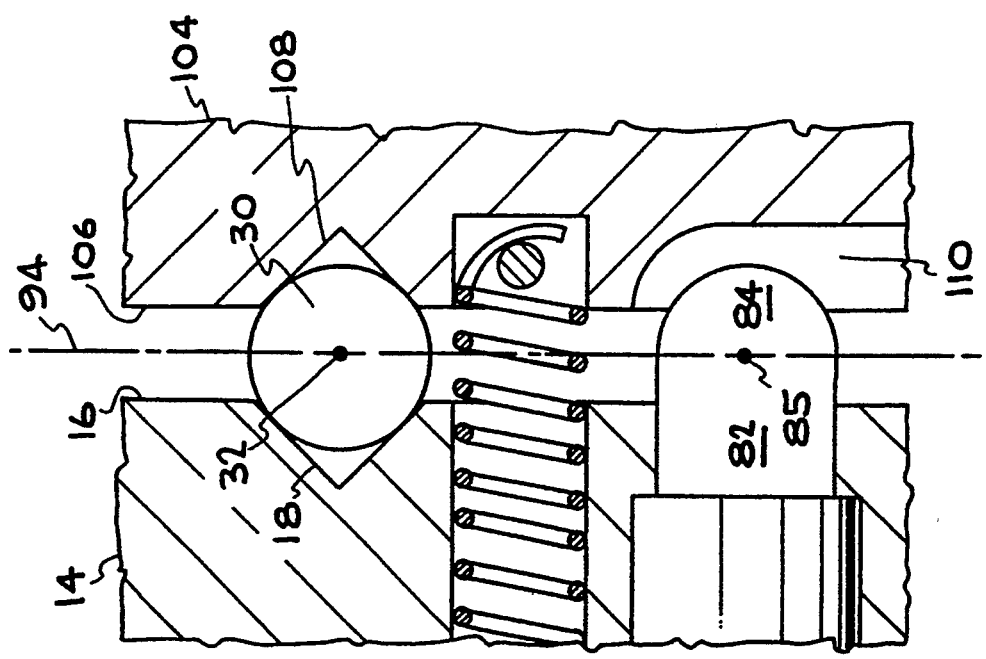
FIG. 6 is a fragmentary view of a portion of the adjustable mirror mounting apparatus illustrating the parallel alignment of a horizontal centerline through the center of the pivot ball and the center of the hemispherical horizontal adjustment contact with the horizontal axis of the mirror.
Figure 5:
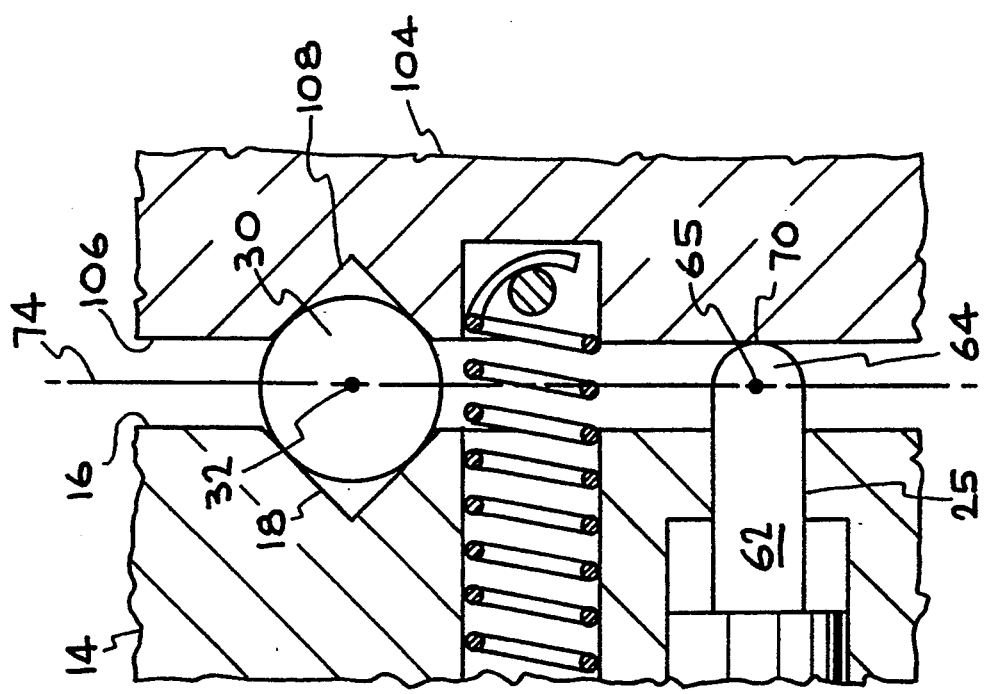
FIG. 5 is a fragmentary view of a portion of the adjustable mirror mounting apparatus illustrating the parallel alignment of a vertical centerline through the center of the pivot ball and the center of the hemispherical vertical adjustment contact with the vertical axis of the mirror.

Referring now to FIGS. 5 and 6, in a preferred embodiment, cross talk between the X and Y axes is further reduced by parallel alignment, with the plane of planar surface 106, of the centerlines passing respectively through center 32 of spherical pivot ball 30 and the centers of hemispherical heads 64 and 84.

Thus, as shown in FIG. 5, vertical centerline 74 passes through center 32 of spherical pivot ball 30 and through center 65 of hemispherical head 64 is shown as parallel to the Y axis of planar surface 106. This alignment may be accomplished by selecting a radius for hemispherical head 64 equal to the distance from center 32 of spherical pivot ball 30 to the plane of planar surface 106. That is, the radius of hemispherical head 64 must be selected to be smaller than the radius of spherical pivot ball 30 by the amount that spherical pivot ball 30 protrudes into planar surface 106 via conical bore 108, as can be seen in FIG. 5.

However, as shown in FIG. 6, parallel alignment of the X axis of planar surface 106 to horizontal centerline 94, which passes through center 32 of spherical pivot ball 30 and center 85 of hemispherical head 84, is more easily accomplished since hemispherical head 84 protrudes into rear wall 104 of mirror frame 100 similarly to spherical pivot ball 30. Such alignment can then be accomplished by using the same radius for hemispherical head 84 as the radius of spherical pivot ball 30 and then making the depth and slope of v-shaped groove 110 equal to the depth and slope of conical bore 108, e.g., by making both groove 110 and conical bore 108 v-shaped at 90° in cross-section.

While various materials could be used, respectively for base 10, mirror frame 100, spherical pivot ball 30 and hemispherical-headed pistons 62, and 82, it is preferable that all of these components be constructed of low wear materials, preferably a hardened steel material or equivalent.

The adjustable mirror mount apparatus of the invention may be successfully employed with mirrors up to about 3 inches in diameter and used to control mechanical vibrations and other mechanically or electrically generated beam position jitter at frequencies up to about 500 Hz, being capable, without further mechanical adjustment, of providing variations in mirror position of up to about 600 micro radians peak to peak via operation of the transducers.

While a specific embodiment of the adjustable mirror mount apparatus of the invention has been illustrated and described, modifications and changes of the apparatus, parameters, materials, etc. will become apparent to those skilled in the art, and it is intended to cover in the appended claims all such modifications and changes which come within the scope of the invention.

What is claimed is:

1. An adjustable high bandwidth mount for a mirror comprising:

a) a mirror support base member having a horizontal portion and a vertical portion having a planar side surface thereon;

b) a mirror frame containing a mirror and having a planar rear surface behind said mirror parallel to a reflective surface of said mirror and facing said planar side surface of said mirror support base member;

c) a pivotal ball serving as a central pivot mount for mounting said mirror frame centrally to said vertical portion of said base member, said central pivot mount including a sphere partially received in a conical opening in said planar side surface of said mirror frame and;

a conical opening in said planar side surface of said mirror support base member of smaller diameter than said sphere;

d) first adjustment means in said vertical portion of said mirror support base member, said first adjustment means including first yieldable means coupled between said mirror frame and said mirror support base member for biasing said mirror frame toward said mirror support base member; and first adjustable driver means mounted in said mirror support base member and in contact with said mirror frame at a first contact point to resist said bias of said first yieldable means the first adjustable means being operationally coupled to said planar rear surface of said mirror frame spaced from said central pivot mount for adjusting the movement of said mirror about one axis lying in the plane of said reflective surface of said mirror; and e) second adjustment means in said vertical portion of said mirror support base member, said second adjustment means including:

second yieldable means coupled between said mirror frame and said mirror support base member for biasing said mirror frame toward said mirror support; and second adjustable driver means mounted to said mirror support base member and in contact with said mirror frame at a second contact point to resist said bias of said second yieldable means said second adjustable means being operationally coupled to said planar surface of said mirror frame and spaced from said central pivot mount for adjusting the movement of said mirror about a second axis lying in the plane of said reflective surface of said mirror and perpendicular to said first axis.

2. The adjustable mirror mount of claim 1 wherein said central pivot mount further comprises:
a) a conical bore centrally formed in said planar rear surface of said cylindrical mirror frame, with the axis of said conical bore coaxial with the axis if said mirror frame;
b) a conical bore positioned in said planar side surface of said mirror support base member; and
c) a sphere of larger diameter than either of said conical bores, received in said respective conical bores to pivotally control spacing between said planar rear surface of said mirror frame and said planar side surface.

3. The adjustable mirror mount of claim 1 wherein said first contact point and the center of said sphere lie in a first plane perpendicular to the plane of the reflective surface of said mirror; and said second contact point and said center of said sphere lie in a second plane perpendicular to said plane of said reflective surface of said mirror and perpendicular to said first plane to provide adjustment of said mirror in both the X and Y axes of said plane of said reflective surface of said mirror.

4. The adjustable mirror mount of claim 1 wherein the attachment point of said first yieldable means to said mirror frame, said first contact point, and the center of said sphere all lie in a first plane perpendicular to the plane of the reflective surface of said mirror; and the attachment point of said second yieldable means to said mirror frame, said second contact point, and said center of said sphere lie in a second plane perpendicular to said plane of said reflective surface of said mirror and perpendicular to said first plane to provide adjustment of said mirror in both the X and Y axes of said plane of said reflective surface of said mirror.

5. The adjustable mirror mount of claim 1 wherein said first adjustable driver means is provided with a first hemispherical end portion in contact with said planar surface of said mirror frame; and the radius of said first hemispherical end portion is equal to the radius of said sphere comprising said central pivot mount less the amount that said sphere extends into said conical opening in said mirror frame; whereby the center of said first hemispherical end portion and center of said sphere lie in a plane parallel to said plane of said reflective surface of said mirror.

6. The adjustable mirror mount of claim 5 wherein a second hemispherical end portion is provided to said second adjustable driver means, said second hemispherical end portion being received in a groove formed in said planar rear surface of said mirror frame, whereby rotation of said mirror frame in the plane of said reflective surface of said mirror is inhibited.

7. The adjustable mirror mount of claim 6 wherein the radius of said second hemispherical end portion less the distance which said second hemispherical end portion extends into said groove is equal to the radius of said sphere comprising said central pivot mount less the amount that said sphere extends into said conical bore in said mirror frame; whereby the center of said second hemispherical end portion and said center of said sphere lie in a plane parallel to said plane of said reflective surface of said mirror.

8. The adjustable mirror mount claim 6 wherein said groove formed in said planar rear surface of said mirror frame is v-shaped with a 90° cross-section and said central conical bore in said planar rear surface of said mirror frame also has a 90° cross-section; the diameter of said v-shaped groove and said conical bore are identical; and the radii of said second hemispherical end portion and said sphere are also identical; whereby the center of said second hemispherical end portion and said center of said sphere lie in a plane parallel to said plane of said reflective surface of said mirror.

9. The adjustable mirror mount apparatus of claim 1 wherein a first transducer means is operationally connected to said first adjustable driver means to adjust said mirror in said one axis of said plane of said reflective surface of said mirror; and a second transducer means is operationally connected to said second adjustable driver means to adjust said mirror in said other axis of said plane of said reflective surface of said mirror.

10. The adjustable mirror mount of claim 1 wherein said mirror is circular; and said mirror frame comprises an end wall having a planar outer surface comprising said planar rear surface, and a cylindrical sidewall surrounding the outer edge of said circular mirror; said pivot ball being located at the center point of said planar rear surface of said mirror frame.

11. The adjustable mirror mount of claim 10 wherein said planar side surface and said mirror frame is cylindrical.

12. The adjustable mirror mount of claim 1 wherein said first adjustment means is contiguous with said mirror frame.

13. The adjustable mirror mount of claim 14 wherein said second adjustment means is contiguous with said mirror frame.

14. The adjustable mirror mount of claim 1 wherein said frame contacts said mirror on every side other than said reflective surface.

15. A high bandwidth mirror mount for a mirror comprising:
a) a mirror support base member having a first portion and a second portion, said second portion depending perpendicularly from said first portion;
b) a mirror frame containing said mirror;
c) a central pivot mount for mounting said mirror frame centrally to said second portion of said base member, the central pivot mount defining an intersection of a first alignment axis, disposed along said mirror frame and a second alignment axis, disposed along said mirror frame;
d) first adjustment means in said second portion of said mirror support base member for adjusting movement of said mirror about one pivot axis lying in the plane of a reflective surface of said mirror, the first adjustment means engaging said mirror frame along the first alignment axis on one side of the intersection; and
e) second adjustment means in said second portion of said mirror support base member for adjusting movement of said mirror about a second pivot axis lying in the plane of said mirror and perpendicular to said first axis, the second adjustment means engaging said mirror frame along the second alignment axis on one side of the intersection.

16. The mirror mount of claim 15, wherein said first and second adjustment means are each contiguous with said mirror frame.

17. The mirror mount of claim 15, having a center of rotation substantially near the center of rotation of said mirror.
a) said first adjustment means comprise:
   i) first yieldable means coupled between said mirror frame and said mirror support base member for biasing said mirror frame toward said mirror support base member; and
   ii) first adjustable driver means mounted in said mirror support base member and in contact with said mirror frame at a first contact point to resist said bias of said first yieldable means; and
b) said second adjustment means comprise:
   i) second yieldable means coupled between said mirror frame and said mirror support base member for biasing said mirror toward said mirror support; and
   ii) second adjustable driver means mounted to said mirror support base member and in contact with said mirror frame at a second contact point to resist said bias of said second yieldable means.

18. The adjustable mirror mount of claim 15 wherein:
a) said first adjustment means comprise
   i) first yieldable means coupled between said mirror frame and said mirror support base member for biasing said mirror frame; and
   ii) first adjustable driver means mounted in said mirror support base member and in contact with said mirror frame at a first contact point to resist said bias of said first yieldable means; and
b) said second adjustment means comprise:
   i) second yieldable means coupled between said mirror frame and said mirror support base member for biasing said mirror frame; and
   ii) second adjustable driver means mounted to said mirror support base member and in contact with said mirror frame at a second contact point resist said bias of said second yieldable means.

* * * * *